(12) United States Patent
Lindenthal

(10) Patent No.: US 7,191,711 B2
(45) Date of Patent: Mar. 20, 2007

(54) SHAFTING ESPECIALLY A CARDAN SHAFT AND HOMOKINETIC BOGIE DRIVE SYSTEM FOR RAIL VEHICLES

(75) Inventor: Hans Lindenthal, Heidenheim (DE)

(73) Assignee: Voith Turbo GmbH & Co. KG, Heidenhelm (DE)

( * ) Notice: Subject to any disclaimer, the term of this patent is extended or adjusted under 35 U.S.C. 154(b) by 0 days.

(21) Appl. No.: 10/499,312

(22) PCT Filed: Oct. 4, 2003

(86) PCT No.: PCT/EP03/11003

§ 371 (c)(1),
(2), (4) Date: Jul. 6, 2004

(87) PCT Pub. No.: WO2004/037596

PCT Pub. Date: May 6, 2004

(65) Prior Publication Data

US 2005/0148396 A1    Jul. 7, 2005

(30) Foreign Application Priority Data

Oct. 19, 2002 (DE) .............................. 102 48 833

(51) Int. Cl.
*F16C 3/00* (2006.01)

(52) U.S. Cl. ............... 105/96; 105/122; 105/132.1; 464/162; 464/147; 464/157; 464/172; 464/106

(58) Field of Classification Search ............... 105/122, 105/123, 96, 132.1; 464/112, 110, 127, 113, 464/1, 4, 182, 162, 147, 154, 156, 157, 172, 464/2, 106
See application file for complete search history.

(56) References Cited

U.S. PATENT DOCUMENTS

| | | | | |
|---|---|---|---|---|
| 2,010,489 A | * | 8/1935 | Ice | 464/26 |
| 2,116,290 A | * | 5/1938 | Spicer | 464/162 |
| 2,380,113 A | * | 7/1945 | Kuhns | 464/154 |
| 2,598,780 A | * | 6/1952 | Garnier | 464/147 |
| 2,680,634 A | * | 6/1954 | Haworth et al. | 464/162 |
| 2,772,547 A | * | 12/1956 | Nolan | 464/162 |
| 3,434,369 A | * | 3/1969 | Runkle | 74/493 |
| 4,867,072 A | * | 9/1989 | Kleim et al. | 105/133 |
| 5,657,545 A | * | 8/1997 | Haworth et al. | 33/1 N |
| 6,877,927 B2 | * | 4/2005 | Paulin et al. | 403/341 |

FOREIGN PATENT DOCUMENTS

| | | |
|---|---|---|
| DE | 44 12 445 | 8/1995 |
| DE | 100 23 372 | 2/2001 |
| EP | 0 480 159 | 4/1992 |
| EP | 1 065 120 | 1/2001 |

* cited by examiner

Primary Examiner—Mark T. Le
(74) Attorney, Agent, or Firm—Baker & Daniels LLP

(57) ABSTRACT

A shafting, particularly a cardan shaft for rail vehicles, has two cardan joints (4,5), each of which comprises two link forks (7–10) coupled to one another by a central part (6). The central part (6) comprises at least two partial elements (38.1,38.2) that are connected to one another in the peripheral direction in a rotationally fixed manner by a shaft-hub connection, and in a displaceable manner in the axial direction. The shafting further includes a rotary actuator (17) arranged in the central part for performing a torsional movement of the corresponding end areas of one of the two partial elements of the central part relative to one another.

21 Claims, 7 Drawing Sheets

$\beta_1 = \beta_2 = 0$ $\beta_1 \neq \beta_2$

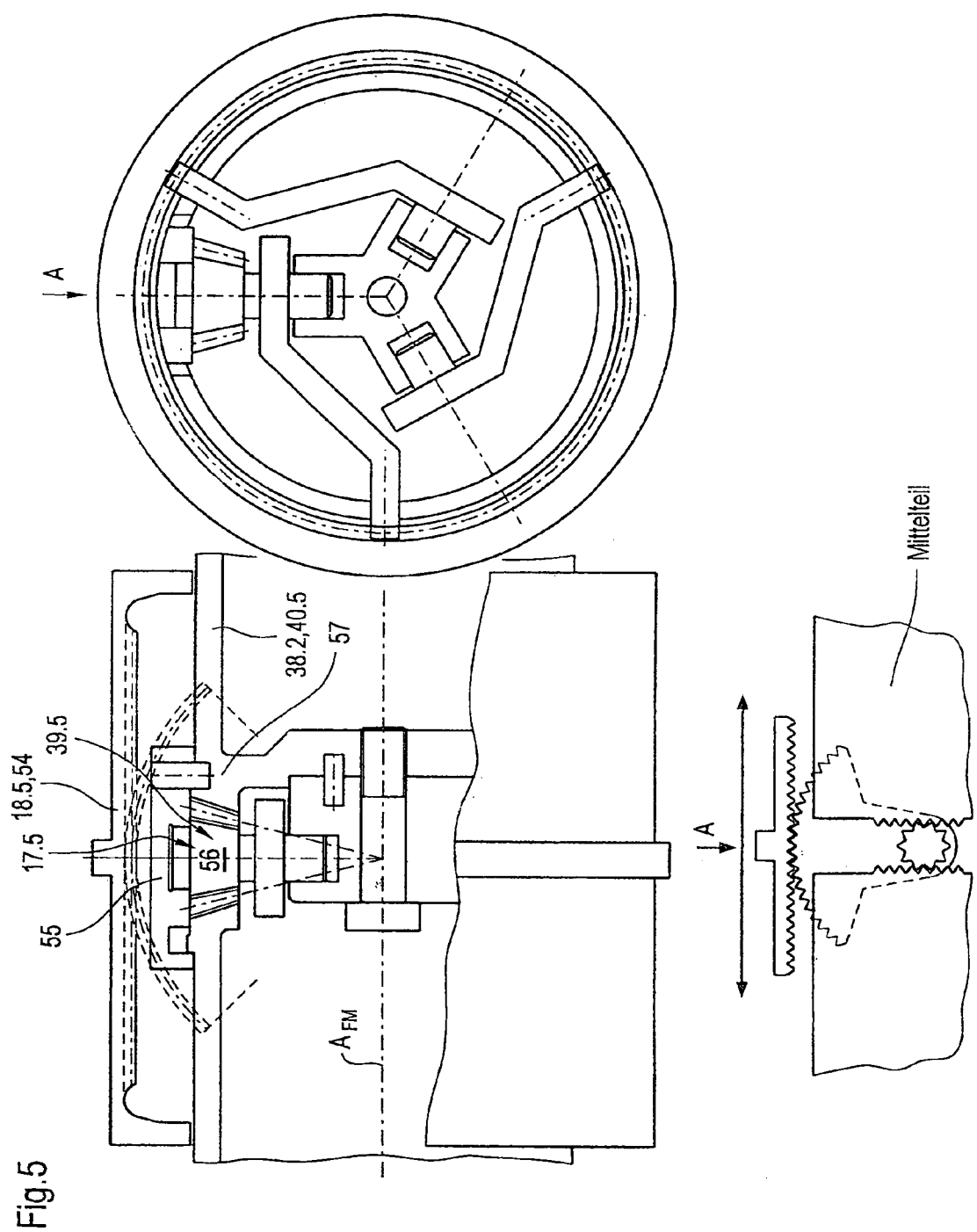

SHAFTING ESPECIALLY A CARDAN SHAFT AND HOMOKINETIC BOGIE DRIVE SYSTEM FOR RAIL VEHICLES

This application is related to and claims the benefit under 35 U.S.C. §119 and 35 U.S.C. §365 of International Application No. PCT/EP2003/11003, filed Oct. 4, 2003.

The invention concerns a line shafting, in particular an articulated shaft, in particular a homokinetic bogie drive for train cars.

The main problems with the use of universal-joint shafts for the connection of two shafts that are arranged in such that they are sloped towards each other are known from Volkmar Kinzer: "Kfz-Kraftübertragung" (Motor Vehicle Power Transmission), Transpress, VEB Verlag für Verkehrswesen. Berlin, 5$^{th}$ Edition, 1977, pp. 145–162. With simple universal-joint shaft assemblies, the driven shaft moves asymmetrically with a fluctuating angular speed when the angular speed of the drive shaft is uniform. The amplitude and the sinusoidal fluctuations of the angular speed or of the lead and lag angle of the drive shaft are thereby heavily dependent on the diffraction angle. This property of a universal-joint shaft is also called the gimbal error and must also be taken into account for the connection and dimensioning of articulated shafts. In particular, the occurring asymmetrical transfer of an initiated constant angular speed as a result of the danger of the excitation of torsional vibrations due to the ongoing deceleration and acceleration of the revolving masses leads to greater stress and premature wear and tear of the journal bearing and the components of the articulated joint itself. By using a second universal-joint shaft in a line shafting, the asymmetry of the output movement can be cancelled, i.e. the asymmetry of the first articulated joint is compensated for by the asymmetry of a second articulated joint. The articulated shafts created by this coupling are characterized by two universal-joint shafts, which are connected by a center piece, which is also called an intermediate shaft. The center piece is thereby as a rule made up of multiple parts, preferably two parts, whereby the two center-piece partial elements are connected by a shaft to collar connection. The coupling thereby takes place in the circumferential direction in a torque-proof manner and is preferably relocated in the axial direction. In order to obtain the complete equalization of the asymmetry of articulated shafts, which are bent in a plane, i.e. in Z or W arrangement, the following requirements must also be fulfilled:

1. Both articulated joints must be turned away from each other at 90°, i.e. both forks of the intermediate shaft or the center piece must lie in one plane.
2. The diffraction angles $\beta_1$ and $\beta_2$ must be the same size.

Only these conditions ensure that a second universal-joint shaft arranged on the output side works with a phase shift of 90° and the gimbal error of the first universal-joint shaft is completely compensated. If one of the conditions is not fulfilled, then the universal-joint shaft will no longer function in a homokinetic manner. An increasing number of areas of application for these types of universal-joint shafts for the transfer of power in drive shafts are known, for which the Z or W arrangement, which guarantees the desired uniformity of the rotary motion on the drive and output flange, is not longer a given in this specific installation location. This applies, in particular, to use in drive shafts of train cars, preferably for the actuation of wheels seated in pivoted bogies. These types of drive systems can be designed in different manners. However, these are distinguished as a rule by the presence of a main engine in the form of an internal combustion engine, a gear box connected with this as well as the implementation of the connection between the gear box and the wheels to be driven, which are seated in a pivoted bogie, via a line shafting in the form of an articulated shaft. In accordance with the arrangement of the gear box, there are different options for the coupling with the pivoted bogie, in particular the wheels seated in it, for example via a wheel set gear box. The individual arrangement options are, however, mainly characterized in that a parallelism is no longer given between the drive and output flange. Furthermore, it should be taken into consideration with these types of drive systems that the connection to the pivoted bogie based on the vehicle axis, which in the neutral state, i.e. with a non-deflected pivoted bogie, is characterized by the symmetrical axis in the drive direction, is subjected to an angle change. In particular, this is the case when driving around curves, in which a movement of the pivoted bogie occurs depending on the type of curve right-hand or left-hand curve and the curve radius. It is known that the gimbal error can be corrected by the repositioning of the fork during assembly, for example. i.e. the elements of the center piece are already assembled with a slight misalignment and turned in the circumferential direction. The forks with the cross axes then no longer lie in the plane. In a correct allocation, the thus-created phase shift then compensates for the gimbal error angle. However, this design does not solve the problems during the transfer of power in a drive shaft for train cars, in particular for the actuation of wheels seated in a pivoted bogie due to the spatial diffraction and the intermittent change of the diffraction angle.

Therefore, the goal of the invention is to create an articulated shaft for use in various drive systems, which always enables a homokinetic transfer of power between the drive- and output-side flange or the connector of the articulated shaft, independently of the installation location and the conditions in the drive shaft during operation. The solution in accordance with the invention is to solve this problem in a particularly advantageous manner for the use of articulated shafts in drive systems for train cars, in particular for the actuation of wheels seated in pivoted bogies. If possible, the solution in accordance with the invention should also be distinguished by little additional constructive effort.

The line shafting in accordance with the invention, in particular the articulated shaft, comprises two universal-joint shafts, which are connected to each other via a center piece. The first universal-joint shaft thereby serves as a connection with a drive, the second universal-joint shaft as a connection with the output side. The center piece is as a rule made up of multiple parts, preferably two parts, whereby the two center-piece partial elements are connected via a shaft to collar connection. This serves to implement a torque-proof connection in the circumferential direction and the axial relocatability of the center-piece partial elements to each other in the longitudinal direction. A torque-proof connection is one wherein the elements so connected are rotationally fixed relative to each other. An adjusting gear is attached to the centre piece in accordance with the invention in order to compensate for the gimbal error. This serves to rotate the end areas of the center-piece partial element joined with output-side universal-joint shaft against each other, i.e. to rotate the area of the center-piece partial element, in which the shaft to collar connection is implemented with the other second center-piece partial element and the end area, which is joined with the second universal-joint shaft. Through this rotation of the end area of the center-piece partial element joined with the output-side universal-joint shaft, it is possible to relegate the two universal-joint shafts—the first universal-joint shaft and the second universal-joint shaft—back to one plane or two perpendicular planes. The joint forks that are each joined with the center piece thereby lie in one plane. The diffraction angle $\beta_1$ and $\beta_2$ between the rotation axis, which corresponds to the axis describable by the center piece and extending through the intersection of the conical axes of the conical cruxes of the two universal-joint shafts, and shaft axes resulting from the position of the drive or output shaft, which are joined with the first or second universal-joint shaft, area also fitted to each other. This makes it possible to avoid the otherwise positioning occurring asymmetric transfer of an introduced constant angular speed $w_1$ on the first universal-joint shaft into an angular speed of $w_2$ on the second output-side universal joint shaft based on an excitation of torsional vibrations through the ongoing deceleration and acceleration of the revolving masses, in particular the element joined with the two universal-joint shafts and the resulting stress and the premature wear and tear of the journal bearing as well as the components of the joint itself. The transfer of an introduced constant angular speed $w_1$ on the first universal-joint shaft that can be joined with the drive can then be transferred uniformly to the second universal-joint shaft through the action of the adjusting gear, provided that the adjusting gear balances the offset angle between the two joint forks joined in a torque proof manner with the first universal-joint shaft and the second universal-joint shaft to the effect that both forks joined with the center piece lie in one plane. This common plane is characterized by the plane running through the center axis determined by the connection of the intersections of the conical axes of the individual universal-joint shafts as well as the conical axis of the joint fork, joined with the center piece, of the first universal-joint shaft. The equalization of the offset angle γ, which characterizes the angle between the planes determined by the joint forks of the universal-joint shafts and the center axis, occurs thereby at maximum 10° so that a clear correlation is given in terms of the torsional direction and the torsional angle as well as the size of the torsional angle. This is always smaller or equal to an angle of (90°–80°).

With the solution in accordance with the invention, it is possible to use standardized, prefabricated articulated shafts with integrated adjusting gear for varying installation locations, in particular for use in drive shafts of train cars, preferably for the actuation of wheels store in pivoted bogies, which can also compensate for the gimbal error in the various installation locations with the most varying constraints. Furthermore, in particular for these power trains, the solution in accordance with the invention can achieve a more uniform transfer of the angular speed to the wheels to be driven than in an installation situation with a clear Z or W arrangement, whereby the drive shaft, in particular the employed line shafting, is not subjected to a large amount of stress. The premature wear and tear of the journal bearings as well as the components of the joint can be prevented. The solution in accordance with the invention thereby leads to the increased availability of the drive shafts with these types of line shaftings, in particular articulated shafts. Repair work and associated down time can thus be greatly reduced, which has a positive effect on business and operations.

The allocation of the adjusting gear to the center piece thereby takes place
a) in the center piece or
b) on the exterior perimeters of the center piece.

The first solution offers the advantage that no additional construction room needs to be provided in the circumferential direction.

The arrangement of the individual elements of the adjusting gear takes place based on the axial extension of the center-piece partial elements, preferably between both.

With respect to the concrete design of the adjusting gear, there are many options. The equalization of the offset angle when the diffraction angle changes takes place in a controlled manner depending on the size of the offset angle γ.

In accordance with the invention, the equalization of the offset angle takes place in a controlled manner, i.e. the adjusting gear is joined with a drive, which implements a rotation or torque over the axial extension of the second center-piece partial element joined in a torque-proof manner, i.e. with the universal-joint shaft arranged on the output side. The inlet of the adjusting gear is thereby joined with a drive, which is free of a coupling with the center-piece partial elements. The output of the adjusting gear is connected in a torque-proof manner with the center-piece partial element joined in a torque-proof manner with the output-side universal-joint shaft. The connection takes place preferably directly in the connection area between the center-piece partial element and the universal-joint shaft, i.e. the corresponding joint fork, which is connected with the center piece. The actuation can be implemented in various forms. It preferably takes place a) electrically or
b) hydraulically or
c) pneumatically or
d) mechanically or
e) a combination of the aforementioned options a) through d).

Servo motors are preferably used as drives—electrical, pneumatic, or hydraulic. Its rotors are connected directly or indirectly in a torque-proof manner with the inlet of the adjusting gear. In electrical servo motors, the power supply depends on the selected type of electrical machine, for example via slip rings, which are attached or seated on one of the two center-piece partial elements.

Hydraulic drive concepts can be implemented via so-called van pump motors or axial- and radial-piston pumps or motors. These are also preferably integrated in the articulated shaft, especially in the center piece. For the actuation itself, embodiments are always selected that are already used in the drive shaft, in which a line shafting designed in accordance with the invention can be applied, or for which energy supply does not present an additional problem. There are a number of options for designing the adjusting gear, whereby this does not need to be subject to any special dimensioning, but rather must only realize a desired rotational movement. For this purpose, a control device is preferably attached to the articulated shaft, comprising at least one control device, which is at least indirectly connected with a recording device for capturing a size characterizing the offset angle at least indirectly and which contains a positioning size creator, which converts the offset angle into a corresponding positioning size for the control of the adjusting gear in order to implement a rotational movement or torque in the order of magnitude of the offset angle. Two devices are preferably provided for capturing the size at least indirectly characterizing the offset angle. These concern corresponding sensors, which capture the individual diffraction angles $\beta_1$ or $\beta_2$ between the shaft connected with the drive-side universal-joint shaft or the connection element and the shaft connected with output-side universal-joint shaft or connection element or which capture the size at least indirectly characterizing this angle. The offset angle γ is formed from the diffraction angles $\beta_1$ or $\beta_2$, whereby through the appropriate allocation the positioning size creator undertakes the control of the actuation, which is connected in a torque-proof manner with the inlet of the adjusting gear. Depending on the selected drive, at least one electrical size, for example the amperage, functions as the positioning size, or for example a hydraulic size in the form of a force. The storage of the drive and the inlet of the adjusting gear can take place fixed on one or both center-piece partial elements, preferably on the output-side center-piece partial element. It is important that no direct torque-proof connection occurs between drive and center-piece partial element and the inlet of the adjusting gear and the center-piece partial element.

The embodiment of the adjusting gear is not subject to limitations. As a rule, two different methods of resolution can be discerned for the functionality of the adjusting gear. In accordance with a first method of resolution, the adjusting gear is arranged between the two center-piece partial elements, whereby the actuation takes place via the rectilinear motion of a bushing element seated preferably on the output-side center-piece partial element. The adjusting gear is therefore implemented as linkage for the conversion of a rectilinear into a rotary motion. This has an inlet and an outlet, whereby the inlet is connected with the bushing element connected with the output-side center-piece partial element, while the outlet is connected with the output-side universal-joint shaft in a torque-proof manner. The coupling of the inlet preferably takes place in the area free of the shaft to collar connection.

In accordance with the second method of resolution, a rotary motion that is transferred via the adjusting gear is predetermined on the drive. This means that a deflection of the distribution of forces is not necessarily required. The introduction takes place coaxial or parallel to the outlet. In both named cases, the connection of the outlet preferably takes place in or near to the coupling area of the output-side center-piece partial element in the area of the axial extension of the other, output-side center-piece partial element, which is free of torque-proof coupling, in particular of the shaft to collar connection. Preferably, the connection of the outlet with the center-piece partial element connected in a torque-proof manner with the output-side universal-joint shaft occurs in the area of the connection of the center-piece partial element with the output-side universal-joint shaft. This ensures that the rotation determined by the effect of the adjusting gear causes the largest possible angle of twist on the joint fork coupled with the center-piece partial element.

The adjusting gear can be implemented as a linkage, in particular deflection gearing with angled or parallel or coaxial arrangement of the inlet and outlet or for example a cam mechanism. The inlet of the adjusting gear is thereby connected with the drive, while the outlet is connected with the output-side arranged universal-joint shaft, in particular that center-piece partial element coupled with this in a torque-proof manner.

The model as cam mechanism can thereby be implemented in the simplest case via a crank guide, which is seated stationary on one of the two center-piece partial elements and in which at least one projection coupled in a torque-proof manner with the other center-piece partial element is directed. The crank guide can thereby be supported on a) the center-piece partial element connected in a torque-proof manner with the universal-joint shaft arranged on the output side or b) the center-piece partial element of the center piece connected in a torque-proof manner with the universal-joint shaft arranged on the output side.

The linkage in the form of the deflection gearing can furthermore comprise a gear rod, which forms a structural entity with or is connected with the component relocatable in the longitudinal direction—with the center-piece partial element coupled with the drive-side universal-joint shaft or the center-piece partial element coupled with the output-side universal-joint shaft. This affects an angled spur or bevel gear, preferably seated in a torque-proof manner perpendicular to the displacement direction, which interconnects with a bevel gear seated in the joint axis or the center axis characterized by the center piece, forms the output of the adjusting gear and is connected in a torque-proof manner with the center-piece partial element coupled in a torque-proof manner with the universal-joint shaft arranged on the output-side. Through the constructive design, in particular the selected translations, the relative movement can be converted as adjustment movement in the axial direction into a torsional movement in the circumferential direction and the corresponding desired offset angle can thereby be counterbalanced. The equalization takes place in all of these cases through the transposition of the second center-piece partial element over its axial extension observed in the direction of the output-side universal-joint shaft, since the torque-proof connection is not offset by the shaft to collar connection between the center-piece partial elements of the balancing movement for the balancing of the offset angle.

The embodiments in accordance with the second method of resolution are characterized by the coaxial arrangement from the inlet of the adjusting gear and the drive. Several particularly suitable embodiments will be described below.

In accordance with a particularly advantageous embodiment, this is implemented in the form of a so-called harmonic drive. This drive designation concerns the designation of a special drive, which consists of at least three physical units, an elliptical disk element with a centric hub and a drawn-on elliptically ductile special ball bearing, a cylindrically ductile bushing-like element with external teeth, and a cylindrical circular element with internal teeth. The cylindrical ductile bushing-like element and the discoidal element are preferably made of steel. The elliptical discoidal element with centric hub, which is coupled with the drive in a torque-proof manner at least indirectly, thereby forms the inlet of the adjusting gear. The cylindrical circular element with internal teeth thereby forms the drive of the adjusting gear and is connected in a torque-proof manner with the center-piece partial element coupled in a torque-proof manner with the universal-joint shaft arranged on the output side. In accordance with a particularly preferred embodiment, this center-piece partial element is then implemented as a hollow shaft, whereby the function of the cylindrical circular element with inner teeth is taken over from this in that the inner teeth is integrated into it. The elliptical discoidal element with centric hub thereby deforms via the ball bearing the cylindrically ductile bushing-like element with external teeth, which meshes with the cylindrical ring with the inner teeth, in particular the center-piece partial element, in the opposite-lying areas of the large elliptical axis. With the rotation of the elliptical discoidal element, the large ellipses axis and the tooth-engagement area are thereby displaced. As a rule, the cylindrically ductile bushing-like element has a smaller number of teeth than the cylindrical circular element with inner teeth. The resulting tooth difference between the toothwork of the element designed in a bushing-like manner with external teeth and the circular element with inner teeth is thereby n so that during a rotation of the drive or during a rotation of the drive or entry point drive an angle of twist is implemented at the exit, i.e. on the center-piece partial element joined in a torque-proof manner with the drive-side universal-joint shaft, at a magnitude of n−x, e.g. with x being a maximum of 10. If, for example, the cylindrical, ductile, bushing-like element with external teeth with two teeth is implemented less that the inner teeth on the cylindrical, circular element, i.e. x=2, a relative movement equal to the size of a tooth takes place between the cylindrical, circular, bushing-like element and the cylindrical, circular element with inner teeth already after a half revolution of the elliptical, discoidal element with centric hub, i.e. of the inlet of the adjusting gear; after a full revolution, the movement is equal to the size of two teeth. The offset angle is thereby a result of the toothwork difference between the cylindrical, ductile, bushing-like element and the cylindrical, discoidal element, i.e. between the external and inner teeth as well as the number of revolutions of the inlet of the adjusting gear.

A further embodiment consists of the integration of an adjusting gear in the form of a planetary wheel set into the center piece, whereby the output or outlet of the adjusting gear is connected with the center-piece partial element that is connected in a torque-proof manner with the output-side universal-joint shaft, while the inlet is connected with the drive. There are many options for the design of the planetary wheel set or planetary gear train, whereby the individual elements—inlet and outlet—can be made of any gear elements, i.e. sun wheel, internal gear, base. Through the corresponding coupling of several planetary wheel sets with each other, the desired gear transmission or reduction can take place with respect to the desired offset angle between the inlet and the outlet. The specific design thereby depends on the application requirements and is at the discretion of the expert in charge.

All types of adjusting gears described here can be used for all drive concepts. In accordance with arrangement and design of the inlet of the adjusting gear—coaxial or at an angle to the drive—this can connected directly but also via additional measures for power redirection with these.

There are also many options for the structure of the center piece of the articulated shaft. Both described center-piece partial elements can also be subdivided into other individual elements that are only connected with each other through a torque-proof connection. A unit consisting of a number of individual elements connected with each other in a torque-proof manner, whereby these connections are free of the possibility of an axial displacement, is thereby designated as the center-piece partial element. The only thing that is important is that this entire unit with a further second unit, which is joined in a torque-proof manner with the drive- or output-side universal-joint shaft, in the form of a second center-piece partial element forms a torque-proof connection, which however is characterized by the possibility of a relative movement towards each other in the axial direction. Generally, this type of shaft to collar connection is created for articulated shafts through a spine shaft connection or a tripod.

A particularly advantageous use of the articulated shaft designed in accordance with the invention is in drive trains for train cars, in particular during use for power transmission in drive trains for the actuation of wheels seated in pivoted bogies. With this type of drive train, a parallel arrangement for the drive or output flange, i.e. the universal-joint shafts arranged on the drive or output side, is not given perforce, i.e. sometimes only in the neutral state, i.e. with non-traveled pivoted bogie. In all other operational states, in particular in turns, very high diffraction angles and different diffraction angles are created for both universal-joint shafts and these result in an increased offset angle between both universal-joint planes. The diffraction does not occur then in the plane, but rather spatially. Based on the conditions created specifically when driving around curves, since the curve radii also have an effect on the size of the diffraction angle, the use of an articulated shaft with an adjusting gear in accordance with the invention has enormous advantages, especially from an operational point of view. In particular, due to the equal transfer of power obtained with the articulated shaft designed in accordance with the invention, stress on the individual elements participating in the transfer of power and therefore the wear and tear can be considerably reduced, which results in minimizing repair and maintenance work, which in turn result in a longer service life.

The solution in accordance with the invention is explained using the following figures, which show the following:

FIG. 5a, 5b show an advantageous embodiment for the controlled equalization of the offset angle with an adjusting gear in the form of a cam mechanism;

Figure 2A:
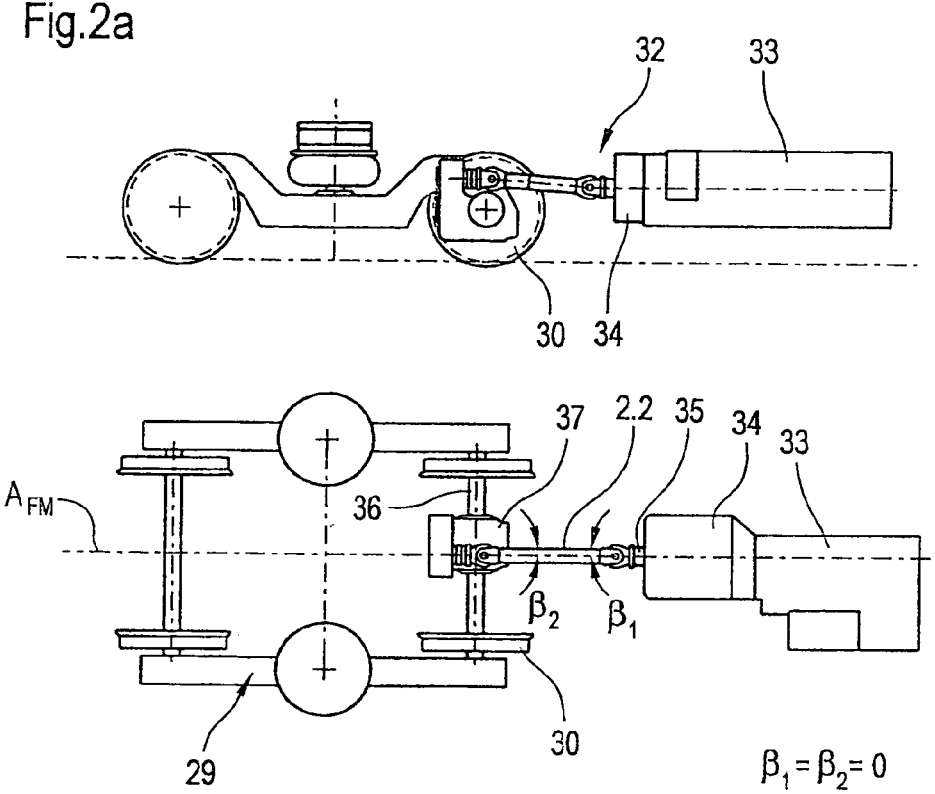
FIGS. 2a, 2b show a schematically simplified representation of the main problem of the use of articulated-shaft trains for the actuation of wheels seated in pivoted bogies in a train car using a drive train for a train car from the state of the art in two functional states.
Figure 2B:
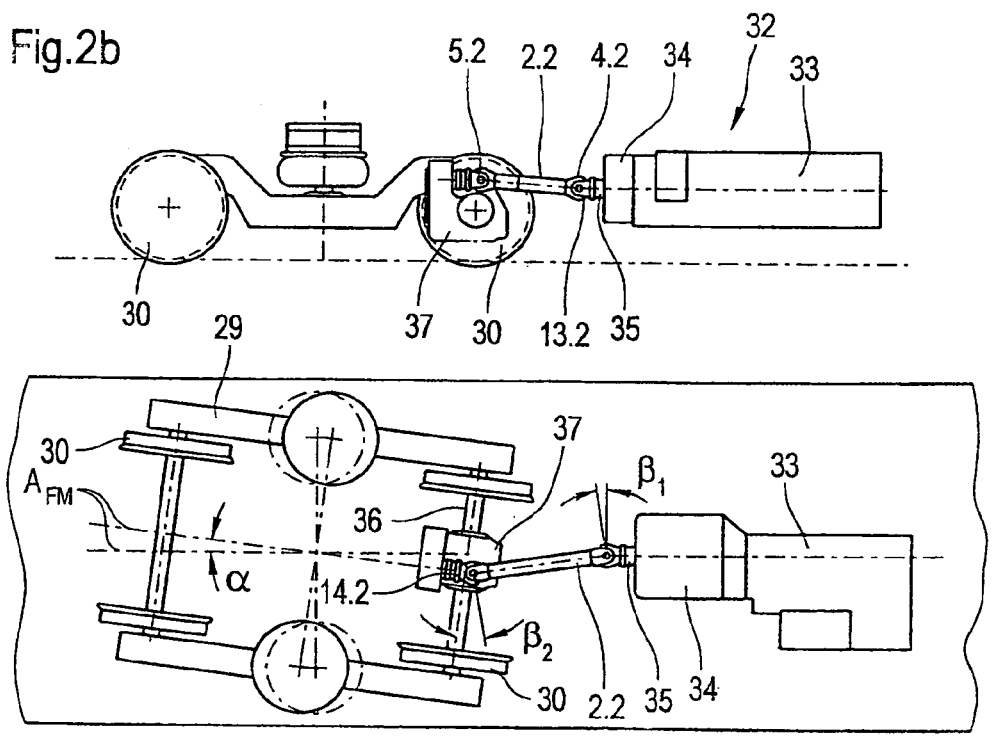
Figure 2C:
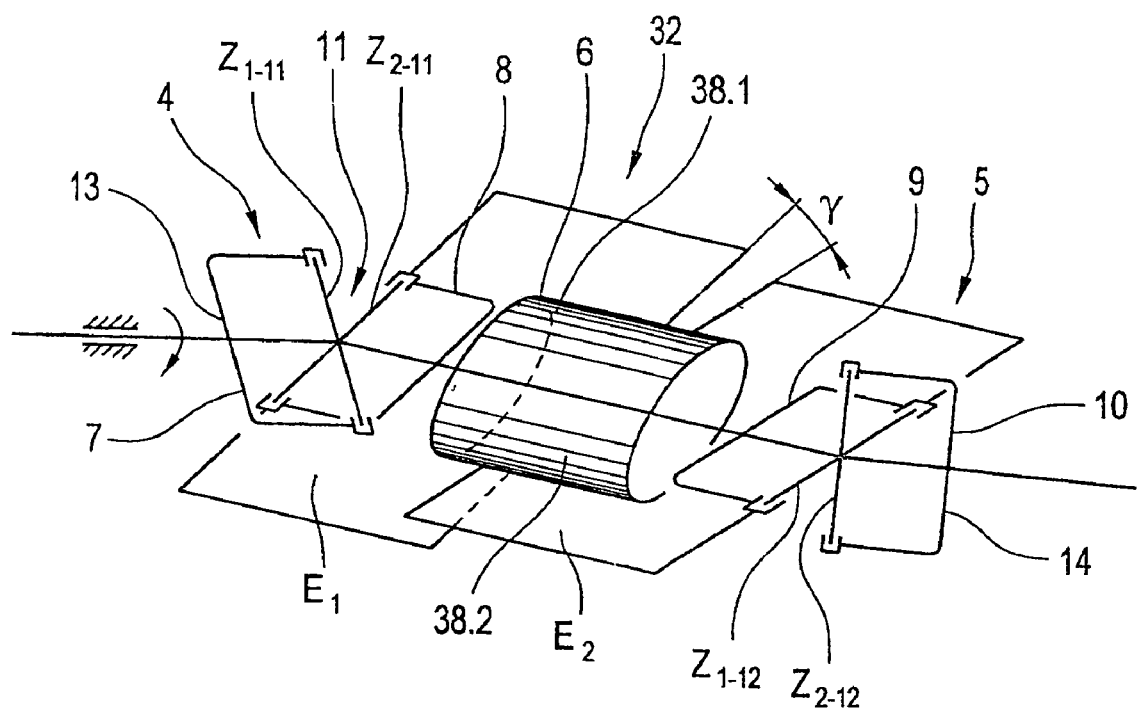

FIG. 2a through 2c show a schematically simplified representation of the main problem when using articulated-shaft trains for the actuation of wheels 30 seated in pivoted bodies 29 in a train car 31 using a section from a drive train 32 of a train car in accordance with the state of the art. FIG. 2a uses two views, one from the right and one from above, using a section from a drive train 32 of a train car to show the ratios at the articulated shaft 2.2 in a neutral state, i.e. with a non-traveled pivoted bogie 29. The drive train further comprises an internal combustion engine, preferably in the form of a diesel motor 33, a gear box 34 connected to this, the outlet 35 of which is connected via the articulated shaft 2.2 with the pivoted bogie 29, in particular the wheel drive shaft 36 seated in this for the actuation of the wheels 30, via a further gear box unit in the form of a so-called wheel set gear box. In this neutral state, the drive and output flange 13.2 or 14.2 of the universal-joint shaft arrangements 4.2 or 5.2 are arranged parallel to each other. In this state, i.e. the neutral position, and design of the pivoted bogie 29 in an angle of 0° with respect to the vehicle center axis $A_{FM}$, which runs in the direction of travel, the diffraction angle is $\beta_1$ of the first universal-joint shaft 4.2, which is joined with the drive equal to zero. This also applies to the second diffraction angle $\beta_2$ for the second universal-joint shaft 5.2, which is connected with the wheels 30 to be actuated via the wheel set gearbox. The ratios shown in FIG. 2b arise for the deflection from the neutral state. These are represented based on the section from the drive train 32 in accordance with FIG. 2a. The same callout numbers are used for the same elements. It can be seen that the drive flange 13.2 and the drive flange 14.2 are no longer implemented in a parallel manner. These always concern the elements forming the connection pieces of the joint forks of the universal-joint-shaft arrangement 4.2 or 5.2, which are each coupled with the drive or output. The diffraction angles $\beta_1$ and $\beta_2$ are adjusted depending on the angle of deflection a of the pivoted bogie 29 vis-à-vis the vehicle center line $A_{FM}$.

It can be seen from both views that this concerns a spatial diffraction.

FIG. 2c shows the ratios set in FIG. 2b using the section from the drive train 32 in a schematically further simplified representation. It can be seen from this that the joint fork 8 coupled with the center piece 6 of the first universal-joint shaft 4 and 9 of the second universal-joint shaft 5 in this state do not lie in a common plane, but rather in two planes $E_1$ and $E_2$. Thus, the joint forks 7 and 10 arranged perpendicular to these can also not lie in the same plane. As a result, the pivot-cross axes $Z_{1-11}$ and $Z_{2-11}$ for the first pivot cross 11 and $Z_{1-12}$ and $Z_{2-12}$ for the second pivot cross 12 are also no longer in the same plane. The offset between the planes $E_1$ and $E_2$ is characterized by the offset angle $\gamma$. The size of the offset angle $\gamma$ thereby determines the rotational non-uniformity with the transfer of power via the articulated shaft 2.2.

Figure 1:
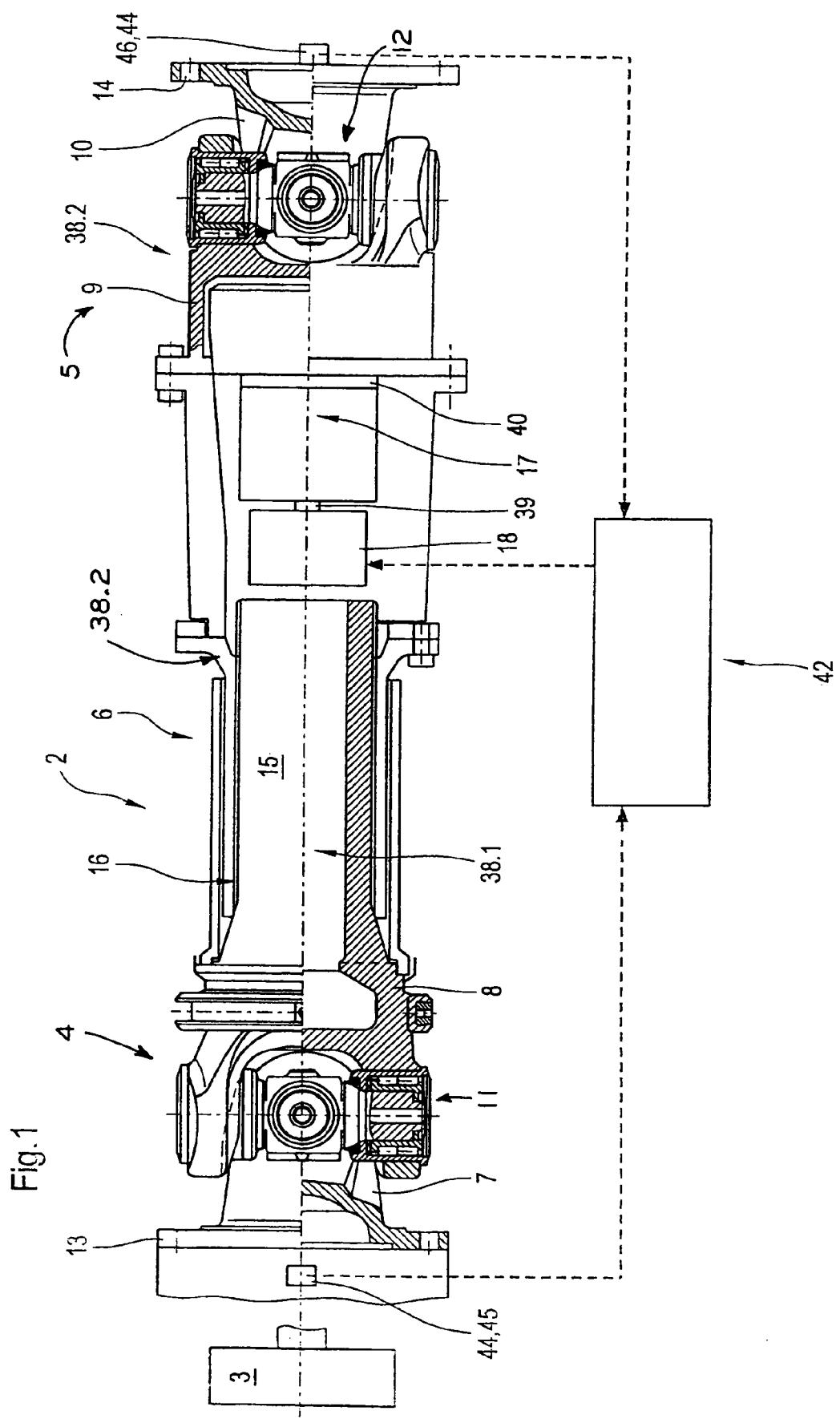
FIG. 1 show a schematically simplified representation of the main structure and the main functionality of the homokinetic drive train designed in accordance with the invention.

FIG. 1 shows a schematically simplified representation of the main structure and the main functionality of the homokinetic drive train 1 designed in accordance with the invention in the form of an articulated shaft 2. This comprises a universal-joint shaft 4 that can be coupled at least indirectly in a torque-proof manner with the drive, a universal-joint shaft 5 that can be coupled at least indirectly the elements to be actuated, i.e. the output, and a so-called center piece 6 arranged between both, which is also called a intermediate shaft. Each universal-joint shaft thereby comprises two joint forks—a first joint fork 7 and a second joint fork 10 for the universal-joint shaft 5. The power transmission between both joint forks 7 and 8 or 9 and 10 takes place via pivot crosses 11 or 12. The first joint fork 7 of the universal-joint shaft 4 can be coupled at least indirectly with the drive 3, whereby the torque-proof connection can be implemented in different ways; for example, the first joint fork 7 can be provided with a flange 13 that can be connected in a torque-proof manner with the drive-side elements. The same applies for the second joint fork 10 of the universal-joint shaft 5, which can be connected in a torque-proof manner with the output. The flange here is referred to as the output flange 14. The second joint fork 8 of the first universal-joint shaft 4 and the first joint fork 9 of the second universal-joint shaft 5 are connected in a torque-proof manner with the center piece 6. This torque-proof connection can also take place via flanges. With firmly adjusted and parallel drive and output flanges 13 and 14, i.e. with a deviation from a Z or W arrangement, an equalization of the gimbal error is possible in accordance with the invention through repositioning of the first joint fork 9 when it is coupled with the center piece during assembly. As a rule, the center piece itself consists of at least two center-piece partial elements 38.1 and 38.2—a shaft 15 and a hub 16—connected with each other in a torque-proof manner and arranged in a relocatable manner in the axial direction. As a rule, the shaft is thereby implemented like a spline shaft, and the hub 16 as an inner-toothed hollow shaft. It is thereby unimportant whether the shaft 15 or the hub 16 is coupled with the drive-side flange or the output-side flange of the articulated shaft. For use in train cars for actuation of wheels seated in pivoted bogies, the resulting offset angle must be adjusted for driving around right or left curves, which can also be implemented with the different radii. In accordance with the invention, this function is fulfilled via an active adjusting gear 17. This gear box can be implemented in various ways and effect a rotational movement between the individual ends of the output-side partial element of the center piece 6, i.e. the hub ends of the hub 16, if it is coupled with the output flange 14, but also the shaft 15, if it is coupled with the output flange 14. The adjusting gear 17 is thereby arranged between the shaft 15 and the hub 16 as well as with the drive-side center-piece partial elements. A drive 18, which can also be implemented in different manners depending on the design of the adjusting gear 17, is attached to this for the realization of the adjustment.

The adjusting gear has an inlet 39 and an outlet 40. According to the drive, i.e. the introduction of power at inlet 39, a free, i.e. any equalization of the offset angle $\gamma$ is possible. The adjusting gear is integrated in the articulated shaft 2. Its outlet 40 is connected in a torque-proof manner with the center-piece partial element 38.2 coupled in a torque-proof manner with the universal-joint shaft 5 arranged on the output side. The inlet 39, however, is free of a coupling with one of the two center-piece partial elements, in particular the center-piece partial element 38.1. The adjusting gear can thereby be seated on one of the two center-piece partial elements 38.1 or 38.2 or with these torque-proof coupled elements. This also applies to drive 18. The only thing that is important is that the torsional movement on the output-side center-piece partial element 38.1 can be set freely, i.e. in any manner. The inlet 39 is connected with a drive 18 in order to provide power. This is also integrated into the articulated shaft 2 or is arranged on it. The control of the drive 18 thereby takes place as a function of the change in the diffraction angles $\beta_1$ and $\beta_2$ and thus of the set offset angle $\gamma$, whereby the control can take place or not. Thus, it is possible to use any type of dimensioned and designed adjusting gear 17, since no rigid coupling exists between the actual offset angle $\gamma$ and the required torsional movement of the ends of the output-side center-piece partial element 38.2 due to the lack of a direct connection of the drive with the center-piece partial element, but rather the torsional movement can be freely set. A control device 42 is provided for setting or control the adjusting gear 17. This comprises a control device 43, for example in the form of a control unit. Furthermore, means 44 are coupled for capturing at least one size characterizing at least indirectly the offset angle or the sizes determining at least indirectly the diffraction angles $\beta_1$ and $\beta_2$. These means 44 preferably comprise at least two sensors 45 and 46, which function as recording devices for at least one size, characterizing the change of the diffraction angles $\beta_1$ and $\beta_2$ at least indirectly. These are coupled with the control device 43. Furthermore, a positioning size creator 47 is provided, which determines the assignment of the resulting offset angle $\gamma$ to a required adjustment on the outlet 40 of the adjusting gear 17 and forms a positioning size for the drive 18. This is then coupled with a positioning device 48 for the drive 18.

FIG. 3 through 6 shows different versions of an adjusting gear 17, which fulfill the requirements for use in articulated shafts 2 for the actuation of wheels seated in pivoted bogies in train cars. These should enable an adjustment at a torsional-moment and operating speed, e.g. of a maximum of 3000 revolutions per minute. With a length adjustment, the axial powers are simultaneously included and the diameter of the adjusting gear 17 is not or is only slightly larger than the diameter of the articulated shaft 2 in the center piece 6. The adjusting gears 17 are thus relatively small, the masses are low. For the control of the adjusting gear 17, FIGS. 3 and 4 included a control device, which accepts the differential angle between β 1 and β 2 in all operational states and transforms into a positioning size for the actuation 18 of the adjusting gear 17.

Figure 3:
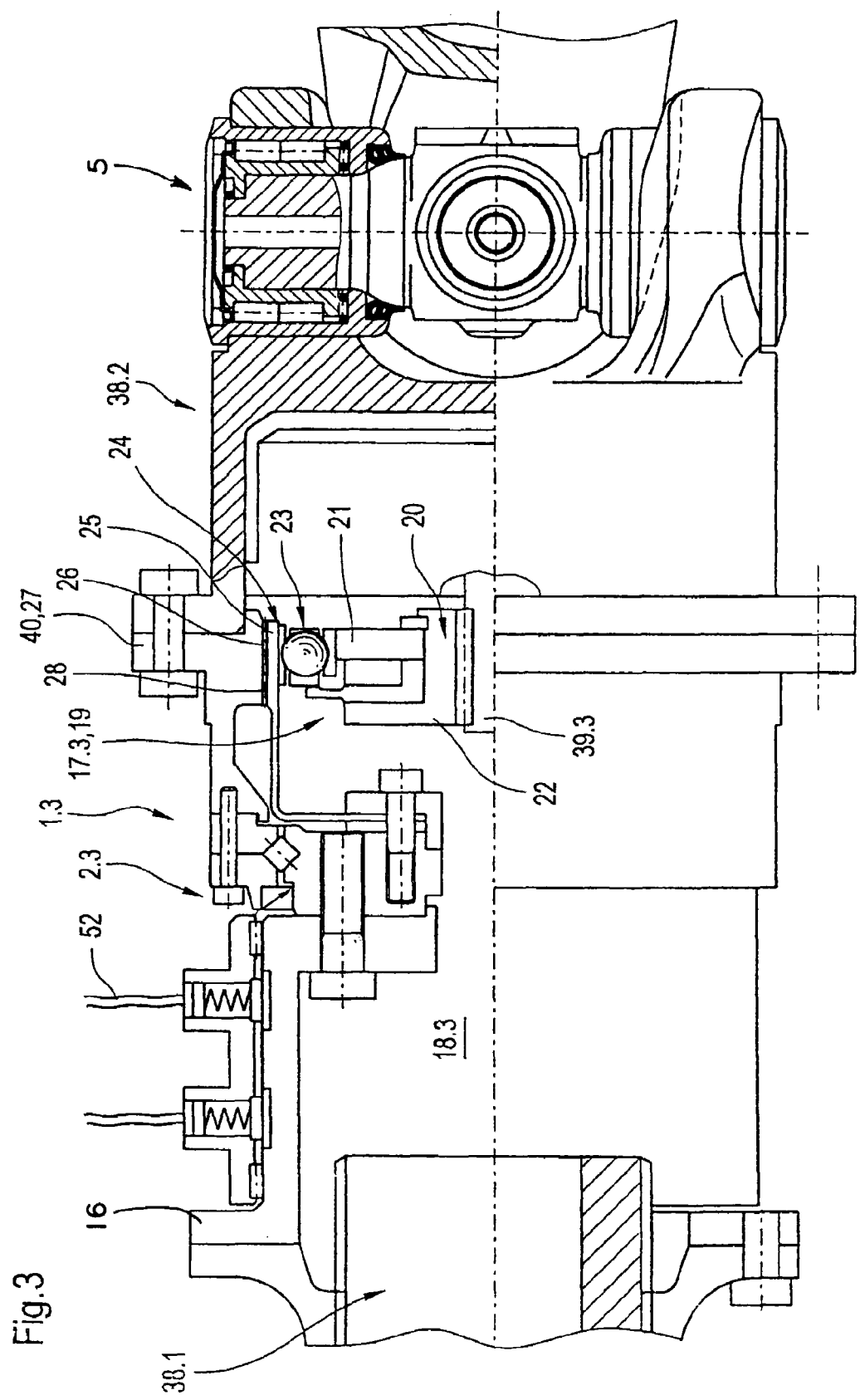
FIG. 3 shows a particularly advantageous embodiment of an articulated shaft in accordance with the invention with an adjusting gear in the form of a harmonic drive gear box and an electrical drive.

FIG. 3 shows a particularly advantageous embodiment of a homokinetic drive train 1.3 in the form of an articulated shaft 2.3 with an adjusting gear 17.3 in the form of a harmonic drive 19 using a section of this. This consists of a so-called wave generator 20, which is understood to include an elliptical steel disk 21 with a centric hub 22 and a razzed, elliptically ductile special ball bearing 23. The harmonic drive 19 furthermore comprises a second component 24, which is designated as a flex spline and which is understood to include a cylindrical, ductile steel bushing 25 with external teeth 26. This component 24 is guided into a cylindrical ring 27 with inner teeth 28, which is connected in a torque-proof manner with the second center-piece partial element 38.2. The inner teeth 28 thereby comb with the external teeth 26 of the cylindrical steel bushing 25. The first component in the form of the wave generator 20is thereby coupled with the drive 18.3. This deforms via the ball bearing 23 the second component 24, i.e. the steel bushing 25 with external teeth 26, which meshes with the inner-toothed fixed cylindrical ring 27 located in the opposite-lying areas of the large elliptical axis. The large elliptical axis and thus the tooth engagement area are displaced with the rotation of the elliptical steel disk 21. With respect to the external teeth 26, the steel bushing 25 has at least one tooth, but preferably two or more teeth, less than the cylindrical ring 27 or its inner teeth 28. Due to this tooth difference, a relative movement equal to the size of a tooth takes place between the steel bushing 25 and the cylindrical ring 27 after a half revolution of the elliptical steel disk 21 and, after a full revolution, the movement is equal to the size of two teeth, or with a corresponding tooth difference, the corresponding number of teeth. With a fixed cylindrical ring 27, the steel bushing 25 rotates as an output element opposite to the drive. The elliptical steel disk.21 of the first component 20 is thereby coupled with the drive 18.3. The steel bushing 25 is connected in a torque-proof manner with the element of the center piece—of the shaft 15.3 or the hub 16.3—that is connected in a torque-proof manner with the drive-side universal-joint shaft 4.3, while the cylindrical ring 27 is connected in a torque-proof manner with the universal-joint shaft 5.3 or the element of the center piece 6.3—of the hub 16.3 or the shaft 15.3—that is coupled in a torque-proof manner with this. In the most simplified case, an electric motor, which is also integrated into the articulated shaft, in particular in the center piece 6.3, functions as the drive 18.3. The power supply takes place via sliding contacts seated on the articulated shaft 2.3. The rotor of the electromotor is thereby stored on one of the two center-piece partial elements 38.1 or 38.2, preferably on the not-to-be-twisted center-piece partial element 38.1. This also applies to the sliding contacts 52. The word storage (or "to store") here means support and not torque-proof connection.

By rotating elliptical steel disc 21, for example, by means of an electric motor (drive 18.3), relative motion between the steel bushing 25 and the cylindrical ring 27 in the circumferential direction is achieved. This causes the first center-piece partial element 38.1 with fork 8 fixed thereto to be rotated relative to the second center-piece partial element 38.2 affixed to fork 9. This relative motion is achieved by the nested arrangement of the elliptical steel disc 21, bearing 23, flex spline 24, steel bushing 25 and cylindrical ring 27, the latter rotationally fixed to element 38.2.

Figure 4:
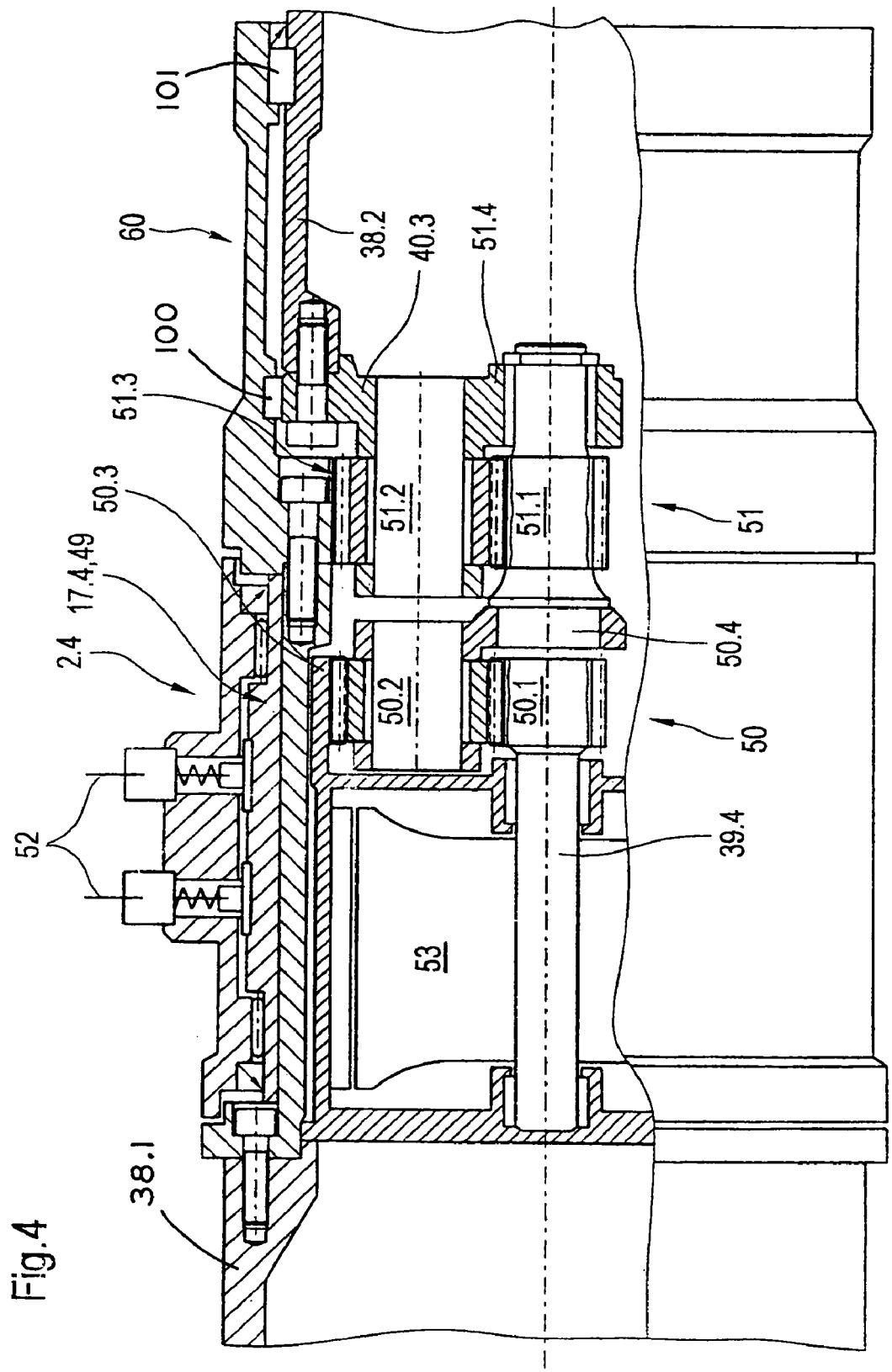
FIG. 4 shows another advantageous embodiment of a homokinetic drive train with an adjusting gear in the form of a planetary gear train.

FIG. 4 shows another embodiment of a homokinetic articulated shaft 2.4 with a positioning gear box 17.4 in the form of a planetary gear train 49. This can be implemented in any manner, but preferably comprises two planetary wheel sets 50 and 51 that are coupled together. The inlet 39.4 of the positioning gear box 17.4 is thereby formed in this case by a sun wheel 50.1 of the first planetary wheel set 50, while the outlet is formed by the base 51.4 of the second planetary wheel set 51. The individual elements of the planetary wheel sets are designated as follows: the sun wheels with 50.1 for the first planetary wheel set and 51.1 for the second planetary wheel set; the planetary wheels with 50.2 for the first and 51.2 for the second planetary wheel set; the internal gear with 50.3 for the first planetary wheel set 50 and 51.3 for the second planetary wheel set 51 and the bases with 50.4 for the first planetary wheel set 50 and 51.4 for the second planetary wheel set 51. The coupling of the first planetary wheel set 50 thereby takes place via the base 50.4 with the sun wheel 51.1 of the second planetary wheel set 51. Other assignment options for inlet 39.3 and outlet 40.3 to the individual elements of the planetary wheel set 50 and 51 as well as the coupling between both planetary wheel sets are also possible. In this case, the base 51.4 is thereby connected in a torque-proof manner with the second center-piece partial element 38.2.

An electric drive was also used as drive 18.4 in the implementation shown in FIG. 4. The power supply here also takes place via distributing rings 52 seated on the articulated shaft 2.4, in particular on the second center-piece partial element 38.2. The rotor 53 of the electrical machine here is also connected in a torque-proof manner with the inlet 39.4. In this case, it is seated on an element supported on the second center-piece partial element 38.2 in the form of a bushing 60.

Sun wheel 50.1 of the first planetary wheel set 50 is the input for the gear box 17. This input can be rotated, for example, by means of an electric motor. The output of the gear box 17 is formed by a base 51.4. which is the planet carrier. Base 51.4 is rotationally fixed to part 38.2. Therefore, by rotating sun wheel 50.1, base 51.4 is rotated due to the torque-proof connection (rotationally fixed) connection between base 50.4 of the first planetary wheel set 50 and the sun wheel 51.1 of the second planetary wheel set 51. When the adjusting gear is activated, it rotates the second center-piece partial element 38.2 relative to the first center-piece partial element 38.1. As illustrated in FIG. 4, gears 50.3 and 51.3 as well as bushings 60 are rotationally fixed to the first center-piece partial element 38.1 and elements 100 and 101 are slide bearing between the second element 38.2 and the first element 38.1 via bushing 60 attached to first element 38.1.

The possible, particularly advantageous embodiments shown in FIGS. 3 and 4 are examples. The solution in accordance with the invention is in no way limited to these embodiments. A control device 42 as in FIG. 1 is assigned to both solutions for the control of the electrical machine, i.e. of the drive 18. This is not shown. Furthermore, it is also possible to replace the drive 18 in the form of an electrical machine with other drive concepts, for example hydrostatic drive units or hydro-motors, which can in turn be drive via different drive concepts. The power supply is seated on the articulated shaft 2 itself. For both solutions, the drive is arranged coaxial to the inlet 39. The rotary drive movement is transformed into a corresponding torsional movement in the circumferential direction.

FIG. 5 shows two views of another version of a homokinetic articulated shaft 2.5 with the option of a free equalization of the offset angle γ through the formation of the positioning gear box 17.5 as a linkage to the transformation of a relative movement of the longitudinal movement, i.e. movement in the axial direction into a torsional movement in the circumferential direction.

Each positioning gear box 17.5 comprises a drive 18.5, which is formed by a inner-toothed bushing 54, which takes on the function of a control shaft. The toothwork of this interconnected with a wheel 55 seated perpendicular to this, which is coupled with a bevel gear 56 and the inlet 39.5 of the positioning gear box 17.5. The bevel gear 56 thereby interconnects with a bevel gear 57, which is connected in a torque-proof manner with the center-piece partial element 38.2, arranged coaxial to the center axis $A_{FM}$. The bevel gear 57 or an element coupled with it in a torque-proof manner thereby forms the outlet 40.5 of the adjusting gear 17.5. The inlet 39.5 is thereby formed by the wheel 55.

Figure 6A:
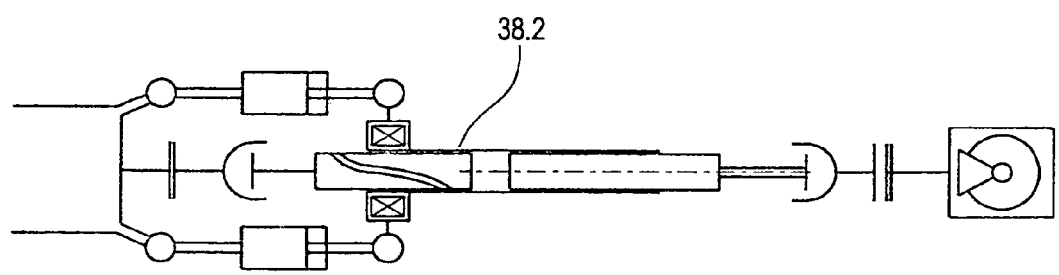
FIG. 6 shows another advantageous embodiment for the controlled equalization of the offset angle with an adjusting gear in the form of a linkage for transforming a longitudinal movement into rotary motion.
Figure 6B:
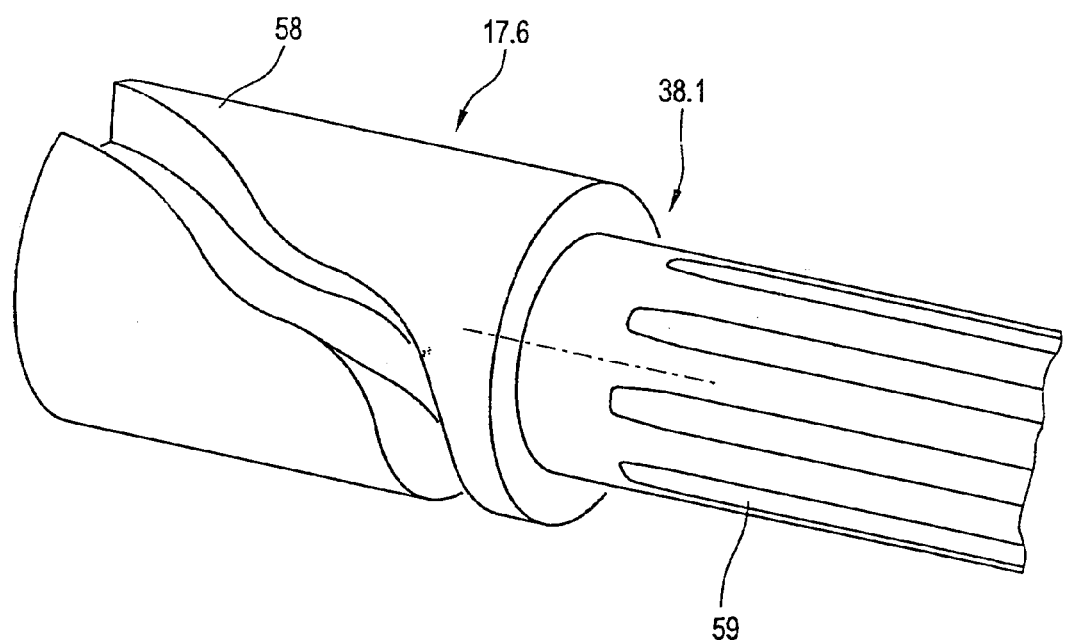

FIGS. 6a and 6b show a schematically simplified view of another version of a homokinetic articulated shaft 2.6 using a location drawing and a sectional view of the center-piece partial element 38.2. The adjusting gear 17.6 is implemented as a cam mechanism. This comprises a crank that is seated on the center-piece partial element 38.1 and into which is inserted at least one complementary projection, which is arranged on an element that is connected in a torque-proof manner with the second center-piece partial element 38.2 in the form of a bushing. The form of the crank is implemented in such a manner that minor displacements between the bushing and the second center piece 38.2 in the axial direction do not lead to a rotation of the second center-piece partial element in the circumferential direction, while the displacements that are determined by rolling turns and that result in a change in the diffraction angle can very well lead to the rotation of the second center-piece partial element in the circumferential direction.

| List of References | |
|---|---|
| 1, 1.3 | Homokinetic drive shaft |
| 2, 2.3 | Articulated shaft |
| 3 | Drive train |
| 4 | First universal-joint shaft |
| 5 | Second universal-joint shaft |
| 6 | Center piece |
| 7 | First joint fork |
| 8 | Second joint fork |
| 9 | First joint fork |
| 10 | Second joint fork |
| 11 | Pivot cross |
| 12 | Pivot cross |
| 13 | Flange |
| 14 | Drive flange |
| 15, 15.3 | Shaft |
| 16, 16.3 | Hub |
| 17; 17.3, 17.4 18, 18.3, 18.4 | Adjusting gear |
| 18.5, 18.6 | Drive train |
| 19 | Harmonic drive |
| 20 | Wave generator |
| 21 | Elliptical steel disk |
| 22 | Centric hub |
| 23 | Ball bearing |
| 24 | Second component |
| 25 | Steel bushing |
| 26 | External teeth |

-continued

| List of References | |
|---|---|
| 27 | Cylindrical ring |
| 28 | Inner teeth |
| 29 | Pivoted bogie |
| 30 | Wheels |
| 31 | Train car |
| 32 | Drive shaft |
| 33 | Diesel motor |
| 34 | Gear box |
| 35 | Outlet |
| 36 | Wheel drive shaft |
| 37 | Wheel set gear box |
| 38.1, 39.2 | Center-piece partial element |
| 39, 39.3, 39.4 | Inlet |
| 40 | Outlet |
| 41 | Shaft to collar connection |
| 42 | Control mechanism |
| 43 | Control device |
| 44 | Means for capturing at the least one of the sizes characterizing at least indirectly the offset angle γ |
| 45, 46 | Recording device |
| 47 | Positioning size creator |
| 48 | Positioning device |
| 49 | Planetary gear train |
| 50 | Planetary wheel set |
| 50.1, 51.1 | Sun wheel |
| 50.2, 51.2 | Planetary wheel |
| 50.3, 51.3 | Internal gear |
| 50.4, 51.4 | Base |
| 51 | Planetary wheel set |
| 52 | Sliding contact |
| 53 | Rotor |
| 54 | Bushing |
| 55 | Spur wheel |
| 56 | Bevel wheel |
| 57 | Bevel wheel |
| 58 | Crank |
| 59 | Wedge teeth |
| 60 | Bushing |
| $E_1, E_2$ | Plane |
| $Z_{1-11}, Z_{2-11}$ | Pivot axes of the pivots of the pivot cross positioned in the first universal-joint shaft 4 |
| $Z_{1-12}, Z_{2-12}$ | Pivot axes of the pivots of the pivot cross positioned in the second universal-joint shaft 5 |

The invention claimed is:

1. Line shafting in the form of an articulated shaft, comprising:

two universal-joint shafts, each comprising two joint forks, which are coupled with each other via a center piece;

the center piece comprising at least two center-piece partial elements, namely, a first center-piece partial element and a second center-piece partial element that are connected with each other in a torque-proof manner via a shaft to collar connection in the circumferential direction and in a relocatable manner in the axial direction;

an adjusting gear box for the implementation of a rotational movement in the circumferential direction of an end area of one of the two center-piece partial elements opposite the shaft to collar connection of said one center piece partial element with the other center piece partial element, the adjusting gear box comprising at least one inlet and an outlet wherein the outlet is connected to the end area of said one center piece partial element that is opposite to the connection with the other center piece partial element, said inlet being supported on one of said center piece partial elements in a non-torque transmitting coupling such that no torque is transmitted between the inlet and the center piece partial element on which the inlet is supported; and a drive connected to the inlet of the gear box.

2. Line shafting in accordance with claim 1, wherein the first center piece partial element forms a shaft and the second center-piece partial element forms a hub or vice versa.

3. Line shafting in accordance with claim 1, wherein the shaft to collar connection is implemented in the form of a splined shaft connection.

4. Line shafting in accordance with claim 1, wherein the inlet of the adjusting gear box is arranged coaxial or parallel to the outlet of the adjusting gear box.

5. Line shafting in accordance with claim 1, wherein the inlet of the adjusting gear box is arranged at an angle to the outlet.

6. Line shafting in accordance with claim 1, wherein the drive and the inlet of the adjusting gear box are arranged coaxial to each other.

7. Line shafting in accordance with claim 1, wherein the drive is arranged at an angle to the inlet of the adjusting gear box.

8. Line shafting in accordance with claim 1, wherein the drive is formed by an electromotor.

9. Line shafting in accordance with claim 8, wherein a rotor of the electromotor is integrated into the center piece and power supply takes place via sliding contacts seated on the articulated shaft.

10. Line shafting in accordance with claim 1, wherein the drive is formed by a hydrostatic servo-motor.

11. Line shafting in accordance with claim 1, wherein the drive is formed by a pneumatic servo-motor.

12. Line shafting in accordance with claim 8, wherein the drive furthermore comprises a relocatable bushing that is motors coupled with the electromotor and is coupled with the inlet of the adjusting gear box.

13. Line shafting in accordance with claim 1, wherein the inlet of the adjusting gear box is arranged parallel or coaxial to a center axis $A_{FM}$ of the articulated shaft.

14. Line shafting in accordance with claim 1, wherein:
the adjusting gear box comprises a planetary gear train with at least two planetary wheel sets;
a first element of one planetary wheel set is connected in torque-proof manner with the drive, an element of the other planetary wheel set is connected in a torque-proof manner with the outlet.

15. Line shafting in accordance with claim 14, wherein
the first element of said one planetary wheel set is formed by a sun wheel and the element coupled in a torque-proof manner with the outlet is formed by a base,
internal gears are seated in a torque-proof manner in a bushing
a base of said one planetary wheel set is connected in a torque-proof manner with a sun wheel of the other planetary wheel set.

16. Line shafting in accordance with claim 1, wherein:
the adjusting gear box comprises an elliptical disk element with a centric hub and special razzed elliptical ductile ball bearings as well as a cylindrically ductile bushing-like element-with external teeth, which meshes with a cylindrically designed discoidal element with inner teeth;
the inlet of the adjusting gear is formed by an elliptical discoidal element with a centric hub;
the cylindrical discoidal element with inner teeth forms the outlet of the adjusting box, and
between the inner teeth and the external teeth, there is a tooth difference of (N−X) with X>0 up to and including a maximum of 10.

17. Line shafting in accordance with claim 1, wherein the adjusting gear box is implemented as a linkage means which transforms a longitudinal movement into a torsional movement.

18. Line shafting in accordance with claim 17, wherein:
the adjusting gear box is implemented as a cam mechanism, comprising a spiral crank into which a spindle is inserted;
the spindle is coupled in a torque-proof manner with the second center-piece partial element.

19. Line shafting in accordance with claim 17, wherein the drive comprises an axially relocatable bushing means which interconnects with a spur gear seated at a right angle to it, which is coupled in a torque-proof manner with a bevel wheel set, the outlet of the bevel wheel set is arranged coaxial or parallel to the center axis of one of the center-piece partial elements.

20. A power train for train cars, especially for the actuation of wheels seated in pivoted bogies, comprising:
a main engine, which is coupled with a gearing unit;
a wheel set gear box seated in a pivoted bogie, the output of which is connected in a torque-proof manner with wheel drive shafts;
the wheel set gear box is connected in a torque-proof manner with the gearing unit at least via a line shafting in accordance with claim 1.

21. A power train in accordance with claim 20, characterized in that the line shafting is attached to a control mechanism comprising a control device, means-for capturing an offset angle at least indirectly, and a positioning size creator, which is connected with the drive.

* * * * *

UNITED STATES PATENT AND TRADEMARK OFFICE
CERTIFICATE OF CORRECTION

PATENT NO. : 7,191,711 B2 Page 1 of 1
APPLICATION NO. : 10/499312
DATED : March 20, 2007
INVENTOR(S) : Hans Lindenthal It is certified that error appears in the above-identified patent and that said Letters Patent is hereby corrected as shown below:

On Title Page

Item (73) Assignee: Delete [Heidenhelm] and insert --Heidenheim--

Column 15, Line 7, after "hub" insert --,--

Column 15, Line 35, delete "motors"

Column 16, Line 11, after "gear" insert --box--

Signed and Sealed this

Twelfth Day of June, 2007

JON W. DUDAS
*Director of the United States Patent and Trademark Office*